(12) United States Patent
Zirgel

(10) Patent No.: US 9,894,715 B2
(45) Date of Patent: Feb. 13, 2018

(54) ELECTRIC HEATING DEVICE

(71) Applicant: MAHLE International GmbH, Stuttgart (DE)

(72) Inventor: Thomas Zirgel, Heidolsheim (FR)

(73) Assignee: MAHLE International GmbH, Stuttgart (DE)

( * ) Notice: Subject to any disclaimer, the term of this patent is extended or adjusted under 35 U.S.C. 154(b) by 187 days.

(21) Appl. No.: 14/742,767

(22) Filed: Jun. 18, 2015

(65) Prior Publication Data
US 2015/0373784 A1    Dec. 24, 2015

(30) Foreign Application Priority Data

Jun. 18, 2014 (EP) ..................................... 14173063

(51) Int. Cl.
| | | |
|---|---|---|
| *H05B 3/02* | (2006.01) | |
| *B60L 1/02* | (2006.01) | |
| *H05B 1/02* | (2006.01) | |
| *H05B 3/26* | (2006.01) | |
| *F24H 3/04* | (2006.01) | |
| *F24H 9/18* | (2006.01) | |
| *B60H 1/22* | (2006.01) | |

(52) U.S. Cl.
CPC .......... *H05B 3/267* (2013.01); *B60H 1/2215* (2013.01); *F24H 3/0405* (2013.01); *F24H 3/0429* (2013.01); *F24H 3/0441* (2013.01); *F24H 3/0464* (2013.01); *F24H 9/1863* (2013.01); *B60H 2001/2278* (2013.01); *F24H 3/0435* (2013.01); *F24H 3/0447* (2013.01); *F24H 9/1872* (2013.01); *Y10T 29/49004* (2015.01)

(58) Field of Classification Search
CPC .......... B60H 1/2215; B60H 2001/2278; F24H 3/0405; F24H 3/0429; F24H 3/0435; F24H 3/0441; F24H 3/0447; F24H 3/0464; F24H 9/1863; F24H 9/1872; H05B 3/267; Y10T 29/49004
USPC ......................... 219/202, 205, 478–479, 505
See application file for complete search history.

(56) References Cited

U.S. PATENT DOCUMENTS

| 1,992,787 A * | 2/1935 | Sutton ...................... H05B 3/48 |
| | | 174/77 R |
| 8,395,088 B2 | 3/2013 | Niederer et al. |
| 2009/0020515 A1 * | 1/2009 | Clade .................... F24H 3/0405 |
| | | 219/202 |
| 2013/0161308 A1 | 6/2013 | Bohlender et al. |

FOREIGN PATENT DOCUMENTS

| DE | 10 2013 103 433 A1 | 10/2013 |
| EP | 2 017 548 B1 | 10/2010 |
| EP | EP 1 916 873 B1 | 10/2010 |

(Continued)

*Primary Examiner* — Sang Y Paik
(74) *Attorney, Agent, or Firm* — Muncy, Geissler, Olds & Lowe, P.C.

(57) ABSTRACT

An electric heating device, particularly for a motor vehicle, is provided that has at least one heating element disposed in a housing, whereby the housing has a housing cover and/or a housing base with at least one opening through which the at least one heating element is disposed protruding at least in sections, whereby a sealing element in which the at least one heating element is disposed is provided in the at least one opening in the housing cover and/or in the housing base.

11 Claims, 16 Drawing Sheets

(56) References Cited

FOREIGN PATENT DOCUMENTS

| | | |
|---|---|---|
| EP | 2 428 747 A1 | 3/2012 |
| EP | 2 607 121 A1 | 6/2013 |
| KR | 10-20090098029 A | 9/2009 |

\* cited by examiner

ELECTRIC HEATING DEVICE

This nonprovisional application claims priority under 35 U.S.C. § 119(a) to European Patent Application No. EP 14173063.0, which was filed on Jun. 18, 2014, and which is herein incorporated by reference.

BACKGROUND OF THE INVENTION

Field of the Invention

The present invention relates to an electric heating device, particularly for a motor vehicle, and to a method for producing the electric heating device. The invention relates in addition to a motor vehicle having the electric heating device.

Description of the Background Art

Electric heating devices are known from the conventional art and are also used as electric auxiliary heaters in a motor vehicle. In particular in motor vehicles with a consumption-optimized internal combustion engine and/or in an electric vehicle, electric heating devices are used to heat a passenger compartment of the motor vehicle and/or of the engine. In this regard, the electric auxiliary heating is used after the internal combustion engine has been started, as long as the internal combustion engine still cannot provide sufficient thermal energy. The internal combustion engine is heated to reach an optimal operating point more rapidly.

The use of the electric heating device can also be provided for many other purposes apart from the motor vehicle, for example, in the field of domestic installations, for climate control of rooms, in industrial facilities, and in many more fields.

An electric heating device, particularly as additional heating for a motor vehicle, is known from document EP 2 017 548 B1, which corresponds to US 2009/0020515. The electric heating device has a plurality of heating elements assembled to form a heating block, a control unit for controlling the heating element, whereby the control unit and the heating block form a structural unit, and contact and/or cooling elements extending between the control unit and the heating block. In this regard, the control unit is held on a control unit support and sealing elements, through which the contact and/or cooling elements project and which are sealed by clamping between the control unit support and the heating block housing, are provided between the control unit support and a heating block housing accommodating the heating block.

The document EP 1 916 873 B1, which corresponds to U.S. Pat. No. 8,395,088, relates to a heat-generating element, particularly for heating air in an electric auxiliary heater of a motor vehicle. The heat-generating element has at least one PTC heating element, an insulating housing surrounding the PTC heating element, and electric strip conductors lying against the PTC heating element on opposite sides. In this regard, the housing comprises a housing shell element and a shell counter element, which lie against each other with the interposition of a sealing strip lying against opposite front sides of the housing element. The sealing element in this case seals the housing elements from each other when a compressive force acts on the heat-generating element from the outside and presses the strip conductors against the at least one PTC heating element, whereby the sealing element sealingly surrounds the at least one PTC heating element.

The document KR 20090098029 A relates to a heating device with PTC heating elements. One PTC heating element unit each is associated with cooling fins arranged to the right and left of the PTC heating element. Connections for connecting to a voltage supply are provided on the PTC heating element.

SUMMARY OF THE INVENTION

It is therefore an object of the present invention to provide an improved electric heating device.

An exemplary embodiment relates to an electric heating device, particularly for a motor vehicle, having at least one heating element disposed in a housing, whereby the housing has a housing cover and/or a housing base with at least one opening through which the at least one heating element is disposed protruding at least in sections, whereby a sealing element in which the heating element is disposed is provided in the at least one opening in the housing cover and/or in the housing base.

The sealing element can be disposed sealingly and without forming a gap on the housing cover and/or on the housing base in the area of the opening. A tight connection between the heating element and the housing can be produced therefore by the sealing element. The penetration of particles, dust, or dirt in general and/or water can be prevented as a result. The sealing element in this case can be an elastic sealing element, for example, a molded seal, made of an elastic material. The sealing element can also be an adhesive/spring connection which has a certain elasticity. Alternatively, the sealing element can be a relatively rigid sealing element, which forms a tight connection zone with the housing cover in the area of the opening by a bevel on the housing and/or the sealing element. Thus, the tight connection zone between the heating element and the housing cover and/or the housing base can be produced with the sealing element.

A plurality of sealing subelements are not necessary, as is the case in the prior art. The sealing element hereby is or can be connected to the housing cover, particularly in the area of the opening. In the unassembled state of the electric heating device, the at least one heating element, which can have an aluminum housing and PTC heating elements disposed therein, the associated sealing element, and the housing are present separately. The sealing element is not connected to the heating element or not connected to the PTC heating elements. During assembly, the heating element can be inserted or disposed in the housing, the sealing element can be disposed on the at least one heating element, and the housing can be closed. A connecting element for an electric supply device of the heating element can be pushed through the sealing element.

The at least one heating element is a first heating element and at least one second heating element is provided, whereby at least one second opening is provided in the housing cover and/or in the housing base, whereby the second opening is used for disposing a further sealing element. In this case, the number of heating elements corresponds to the number of openings in the housing cover and/or housing base and preferably the number of sealing elements. A sealing element can be provided in each opening for receiving the heating element. The individual sealing elements, however, can also be connected and be available as a one-piece sealing element. The heating elements can be arranged in a row next to or behind one another and form a heating block. The heating elements alternatively or in addition can also be arranged in a plurality of adjoining rows.

In this regard, a bevel can be provided on the housing cover and/or on the housing base, for example, on an inner perimeter in the area of the opening in the housing cover and/or housing base. The bevel can be placed in each case on an inner edge of the opening. In this regard, the bevel can be a continuous bevel or be placed in sections in the area of the opening.

Further, a bevel can be placed on a sealing element perimeter of each sealing element. The bevel of the sealing element and the bevel of the housing cover and/or housing base are configured such that a positive-locking connection between the sealing element and the housing cover and/or the housing base is realized in the area of the respective opening.

The bevel can be a surface formation at a sloping surface and/or edge of the inner edge surface of the housing cover and/or housing base in the area of the opening. The bevel in this case can have an angle of approximately 30° to 70°, preferably 45°, to the plane, facing the opening, of the housing cover and/or housing base. The inner edge surface can extend substantially perpendicular to the extension direction of the housing cover. The sealing element can have a certain elasticity and be compressible. A so-called press fit can result thereby during assembly. It can be made possible hereby that a lower exertion of force is necessary to dispose, particularly to fit, the sealing element optimally in the opening in the housing cover and/or housing base. As a result, the heating element can be accommodated optimally in the opening and be disposed securely therein. Apart from realizing the tight connection, the bevel can also improve the positioning of the sealing element in the housing cover and/or housing base.

In an embodiment of the electric heating device, a silicone adhesive and/or silicone gel and/or liquid silicone can be placed at a connecting line between the heating element and the housing cover and/or the housing base in the area of the opening. In this regard, the silicone adhesive and/or the silicone gel can have the function of the sealing element. The positive-locking connection can be optimized as a result. The sealing function between the sealing element and the housing cover and/or housing base can be stable and tight overall against dust, dirt, and moisture.

In a further embodiment of the electric heating device, the housing can have two housing half-shells, whereby the housing half-shells are disposed substantially perpendicular to the housing cover and/or to the housing base. The extension direction of the heating elements can be along the housing half-shells and thus oriented substantially perpendicular to the housing cover and/or housing base. A second additional sealing element can be placed at the abutting edge of the two housing half-shells.

The housing can be a plastic housing, whereby at least the housing half-shells are fabricated of a plastic material. Because of this, a housing can be realized as an electrically insulated housing. In addition, the housing has a relatively low weight because of the low specific weight of the plastic material.

The heating element of the electric heating device can have a PTC heating element, for example, an HV PTC heating element. The PTC heating element has a positive temperature coefficient, whereby the HV PTC heating element can be operated with a voltage greater than 60 V. The PTC heating element itself is preferably disposed in an aluminum housing.

The heating elements, particularly the PTC heating elements disposed in the aluminum housing with connections can form a heating block. In this regard, the heating block can be removed as an element from the housing.

A motor vehicle having an electric heating device is also provided. In this regard, the heating elements, particularly the PTC heating elements, can each be disposed in a first sealing element in the housing cover and/or in the housing base. The sealing element can be a molded seal and/or an adhesive/spring combination. Alternatively or in addition, the housing cover and/or the housing base can have a bevel on an inner edge of an opening receiving the sealing element and the heating element. In addition, the sealing element can also have a bevel, which is configured with a precise fit to the bevel of the housing cover and/or of the housing base.

a method for producing an electric heating device is also provided, which is especially suitable for a motor vehicle. In this case, it can be provided to place a plurality of sealing elements or a one-piece sealing element on the heating block in a process step. In this case, the connection of PTC heating elements located in an aluminum housing goes through the associated sealing element. The separate sealing element as a whole is placed on the heating block and is not mechanically connected thereto. Then, in a next process step the housing can be closed, in particular two housing half-shells can be snapped shut in the extension direction of the individual heating elements of the heating block.

In a process step of a further embodiment of the electric heating device, the introduction of a bevel on the particular housing cover and/or housing base in the area of the opening is provided. In addition or alternatively, the step of placing a bevel on the particular sealing element for receiving the heating element in the housing cover and/or housing base can be provided. The introduction of a bevel can occur by planing, machining, or introduction into the molding tool for producing the housing cover and/or housing base and/or sealing element, if these are produced from an injection molded part.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
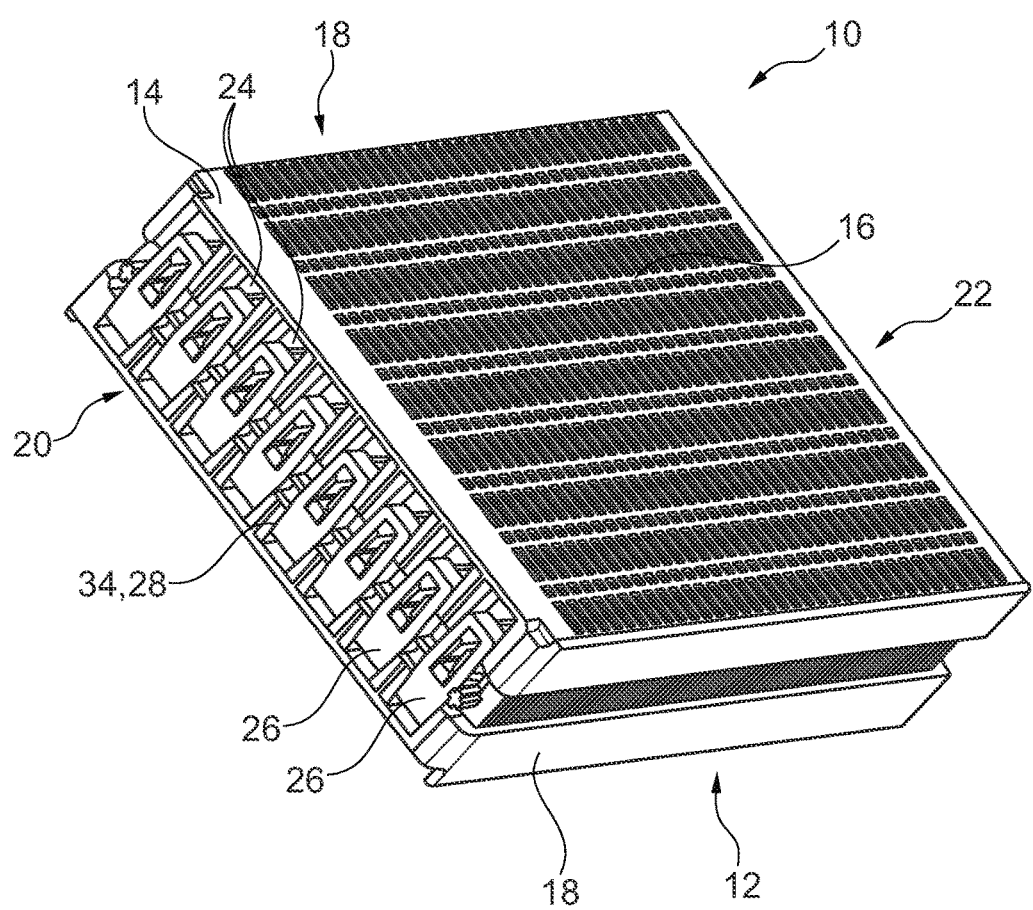
FIG. 1 shows a first exemplary embodiment of an electric heating device of the invention in a perspective view.

FIG. 1 shows an electric heating device 10, which has a housing 12, in a perspective view. Housing 12 in a first embodiment has a plastic frame 14. Plastic frame 14 is used for receiving heating elements (not shown) which can have PTC heating elements. Housing 12 has two housing side elements 16, two housing front elements 18, a housing cover 20, and a housing base 22. Openings 24 in which a heating element (not shown) with a sealing element 26 can be disposed are provided in each case in housing cover 20 and/or in housing base 22. In this case, the heating element is placed in each case in sealing element 26 and/or supported thereby. Sealing element 26 is preferably a flexible sealing element 26 and can represent a molded seal made of an elastic material, especially an elastic plastic. Alternatively, sealing element 26 can be configured as an adhesive/spring combination. Fabrication tolerances of openings 24 in housing cover 20 and/or housing base 22 can be compensated in this way and a sealing of housing 12 against dirt, dust, and moisture can be realized. In particular, protection of the PTC heating elements from dust and/or water can be assured. A bevel 28 can be provided on sealing element 26. A bevel 34 can also be provided on housing cover 20 and/or housing base 22 in the area of opening 24.

Figure 2:
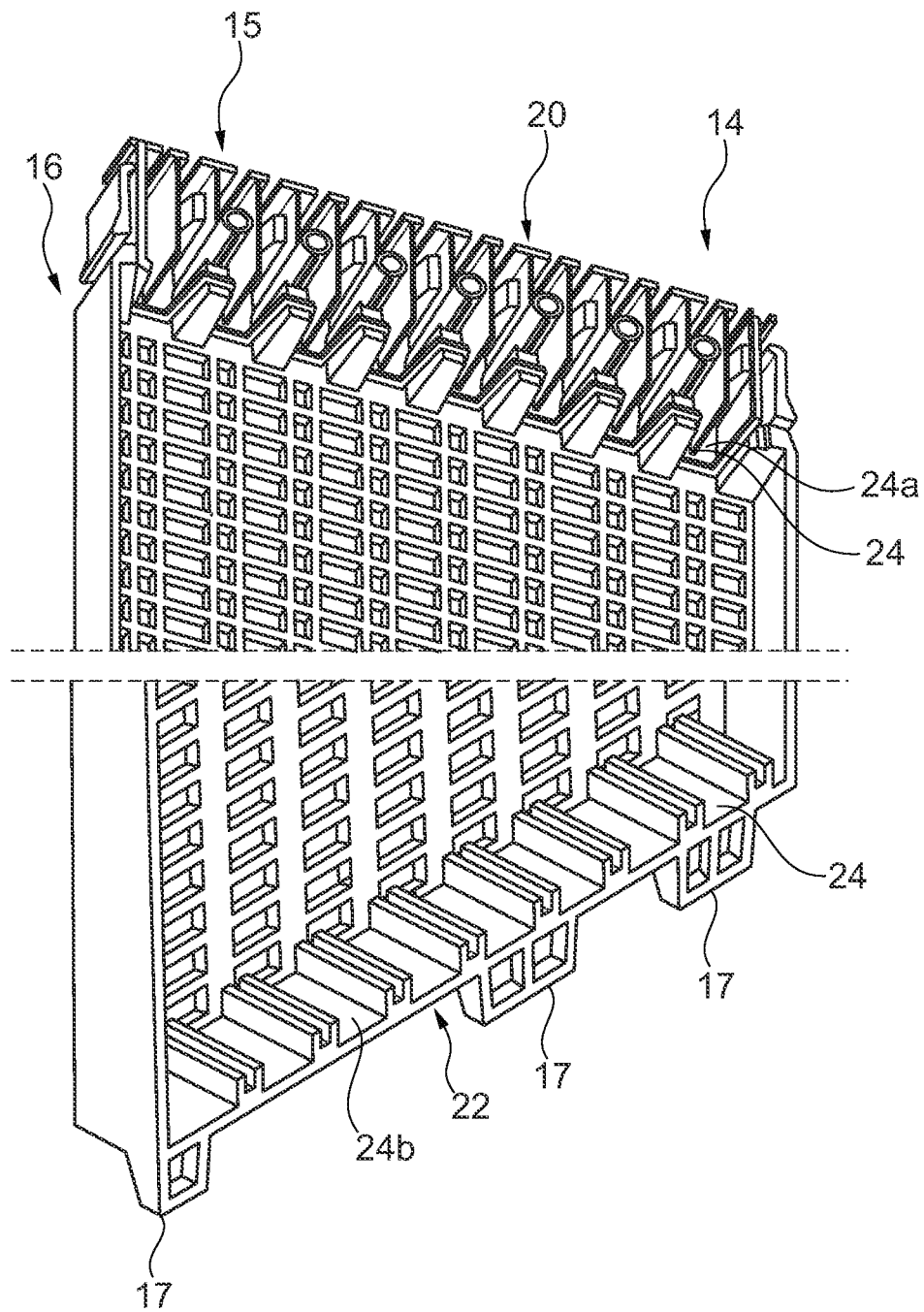
FIG. 2 shows a housing half-shell of the plastic frame of the electric heating device in a perspective view.

FIG. 2 shows an exemplary embodiment of a housing half-shell 15 of housing 12, particularly of plastic frame 14. The same items are labeled with the same reference characters as in FIG. 1. Housing half-shell 15 has housing side part 16 and in each case half of housing front part 18, of housing cover 20, and of housing base 22. Openings 24 for receiving sealing elements 26 are introduced in housing cover 20 and in housing base 22. Openings 24 can be configured as continuous openings 24a, as shown in housing cover 20. Openings 24 can also be configured as blind holes 24b with an opening bottom, as shown in housing base 22. Further, spacer elements 17 are arranged on housing base 22.

Figure 3:
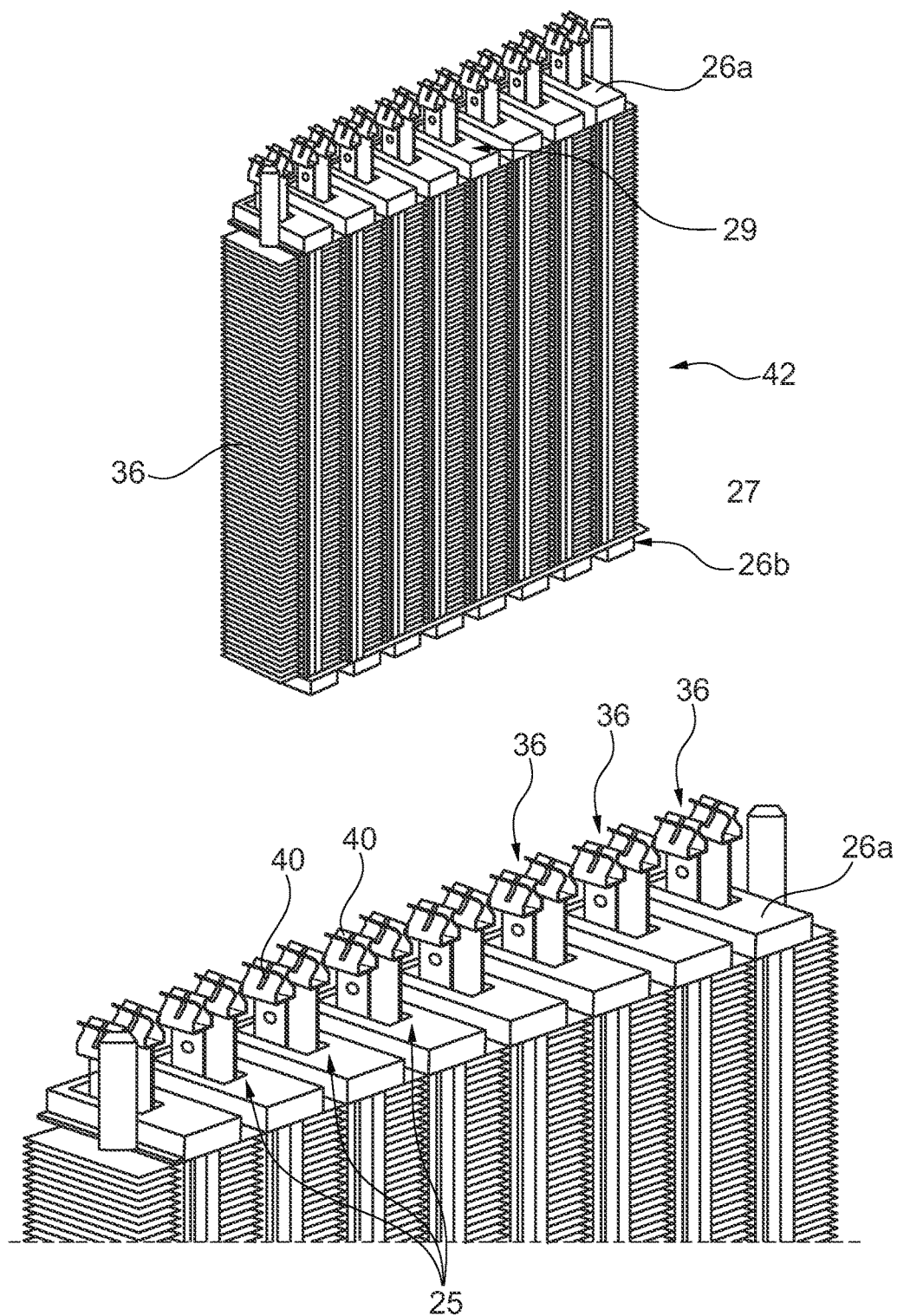
FIG. 3 shows a heating block with heating elements of the electric heating device in a perspective view.
Figure 5:
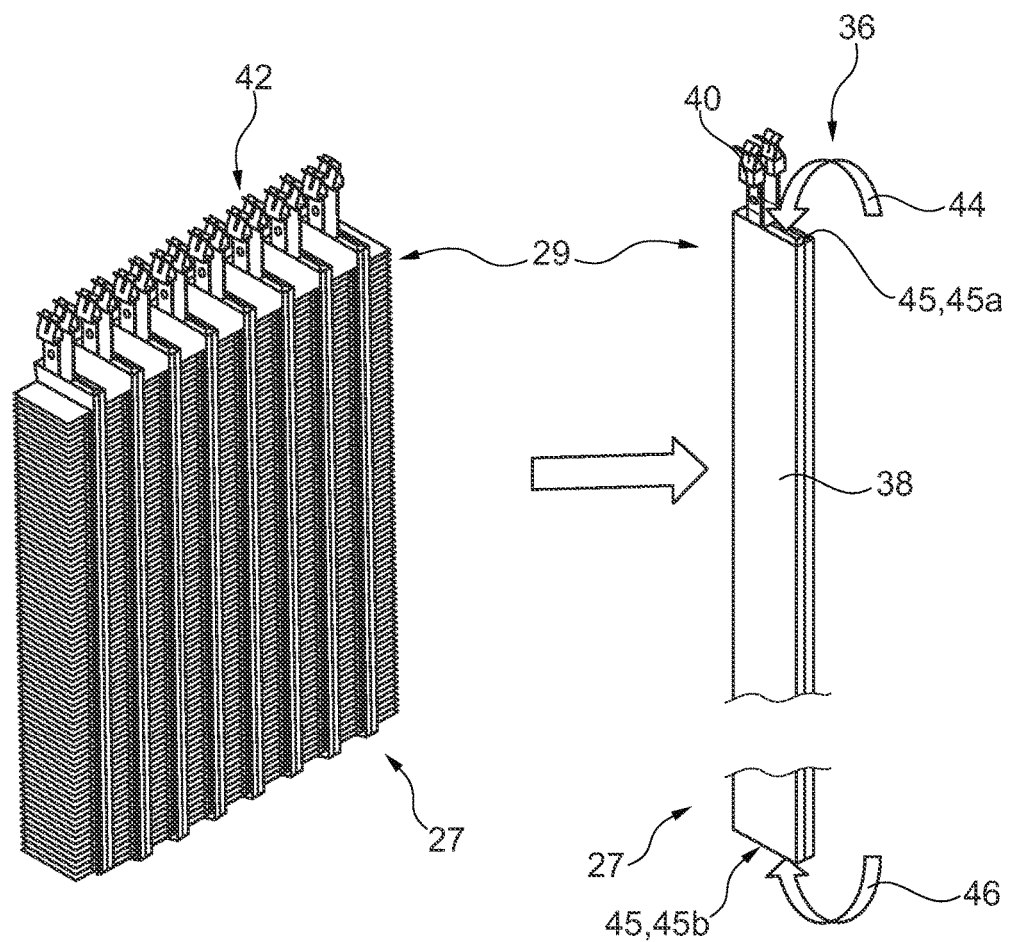
FIG. 5 shows the heating element (on right) and the heating block (on left) with heating elements without a sealing element.

FIG. 3 shows a heating block 42 with electric heating elements 36 arranged in parallel. The same items are labeled with the same reference characters as in FIG. 1 and FIG. 2. Reference is made to FIG. 5 for a detailed description of electric heating elements 36. Sealing elements 26 are disposed on heating element 36 in each case in bottom area 27 and cover area 29 as indicated by the rectangles. Sealing element 26 in cover area 29 is labeled here with reference number 26a and the sealing element in bottom area 27 is labeled with reference number 26b. The arrangement of heating elements 36 in sealing elements 26a is shown in a detailed illustration in the bottom section of FIG. 3. Each heating element 36 projects with a connecting element 40 through an opening 25 of sealing element 26.

Figure 4:
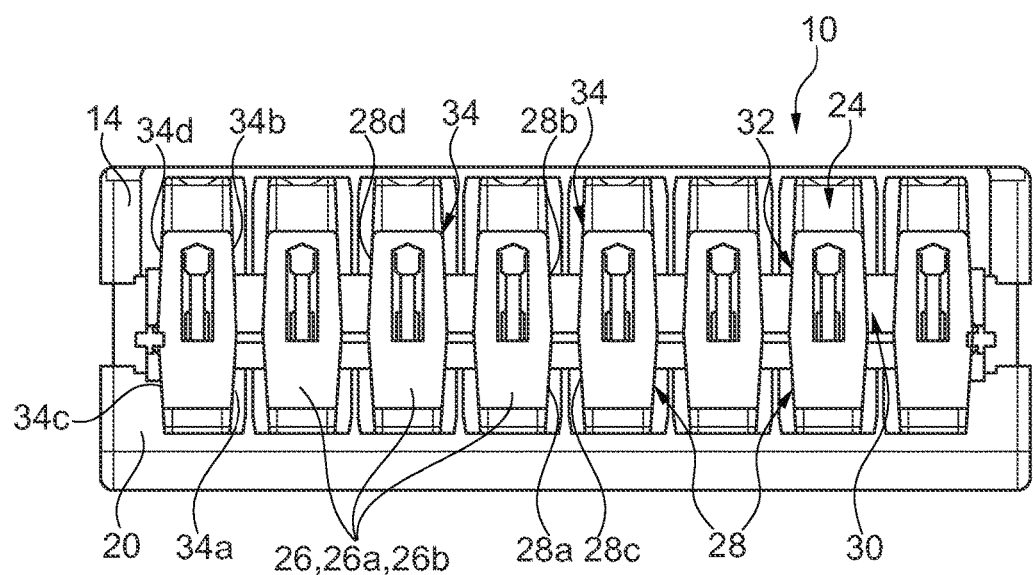
FIG. 4 shows a view of a housing cover of the electric heating device.

FIG. 4 shows electric heating device 10 as a top plan view of housing cover 20. The same items are labeled with the same reference characters as in FIGS. 1, 2, and 3. Sealing element 26, 26a on both sealing element sides 30 and 32 has two bevels each 28a, 28b and 28c, 28d. A sealing element 26, 26a is taken up in each opening 24. Housing cover 20 in the area of opening 24 also has bevel 34. Bevel 34 is placed at four positions of each opening 24, so that a bevel 34, 34a, 34b, 34c, 34d of housing cover 20 and/or housing base 22 is arranged opposite to each bevel 28, 28a, 28b, 28c, 28d of sealing element 26. Bevel 28 and bevel 34 are configured so that they create a positive-locking connection and sealing element 26, 26a is placed in a positive-locking manner in opening 24 of the housing cover 20.

FIG. 5 in the right half of the figure shows heating element 36 with an aluminum housing 38, which is made as a flat aluminum tube 38 and in which PTC heating elements (not shown) are disposed internally. The same items are labeled with the same reference characters as in FIGS. 1, 2, 3, and 4. During the operation of electric heating device 10, aluminum housing 38 is not at potential. Each heating element 36 has connection 40 via which heating element 36 can be connected to an electric supply. A plurality of heating elements 36 are arranged parallel in electric heating device 10 and form heating block 42, which is shown in the left half of the figure.

Dirt and/or particles and/or dust and/or water can enter aluminum housing 38 through an open area 45 at the position indicated by arrow 44 and arrow 46 and damage PTC heating elements 36. Open area 45a is located in cover area 29 and open area 45b is located in bottom area 27.

Figure 6:
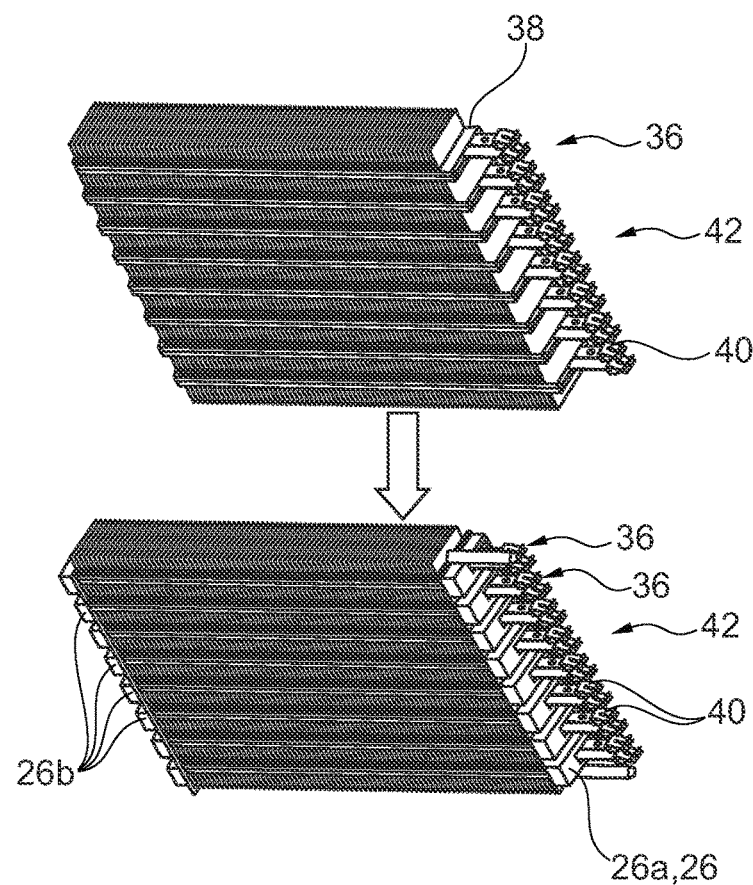
FIG. 6 shows the heating block without sealing elements (at the top) and a heating block with sealing elements (center illustration), and a top plan view of the housing cover (at the bottom)
Figure 6:
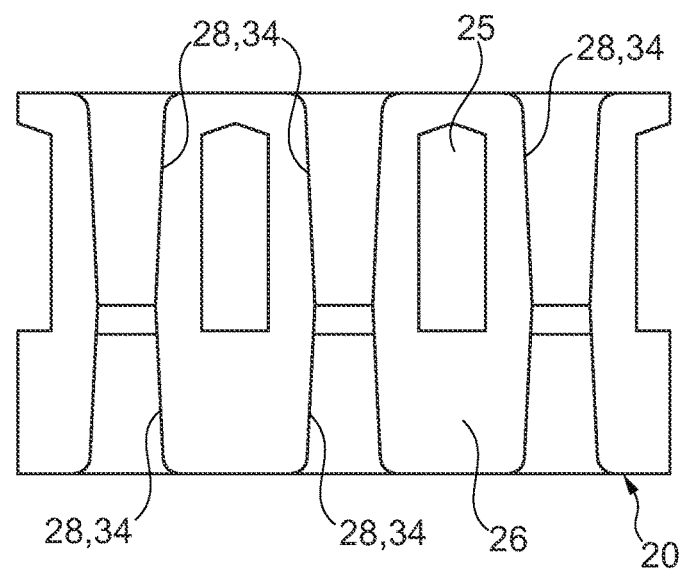

FIG. 6 shows heating block 42 of FIG. 5. The same parts are labeled with the same reference characters. Heating block 42 without sealing element 26 is shown in the top part of the figure and heating block 42 in each case with sealing element 26, 26a, 26b is shown in the middle part of FIG. 6. The particular sealing element 26, 26a, 26b closes the particular open area 45, 45a, 45b of aluminum housing 38. Connection 40 projects through sealing element 26a. Housing cover 20 with sealing elements 26, 26a placed in openings 24 but without heating elements 36 is shown schematically as a top plan view in the bottom part of FIG. 6. Sealing element 26, 26a has opening 25 for receiving heating element 36. Bevels 28, 28a, 28b, 28c, and/or 28d are located on sealing element 26 and/or bevels 34, 34a, 34b, 34c, and/or 34d are located on housing cover 20 at the positions indicated by the arrows.

Figure 7:
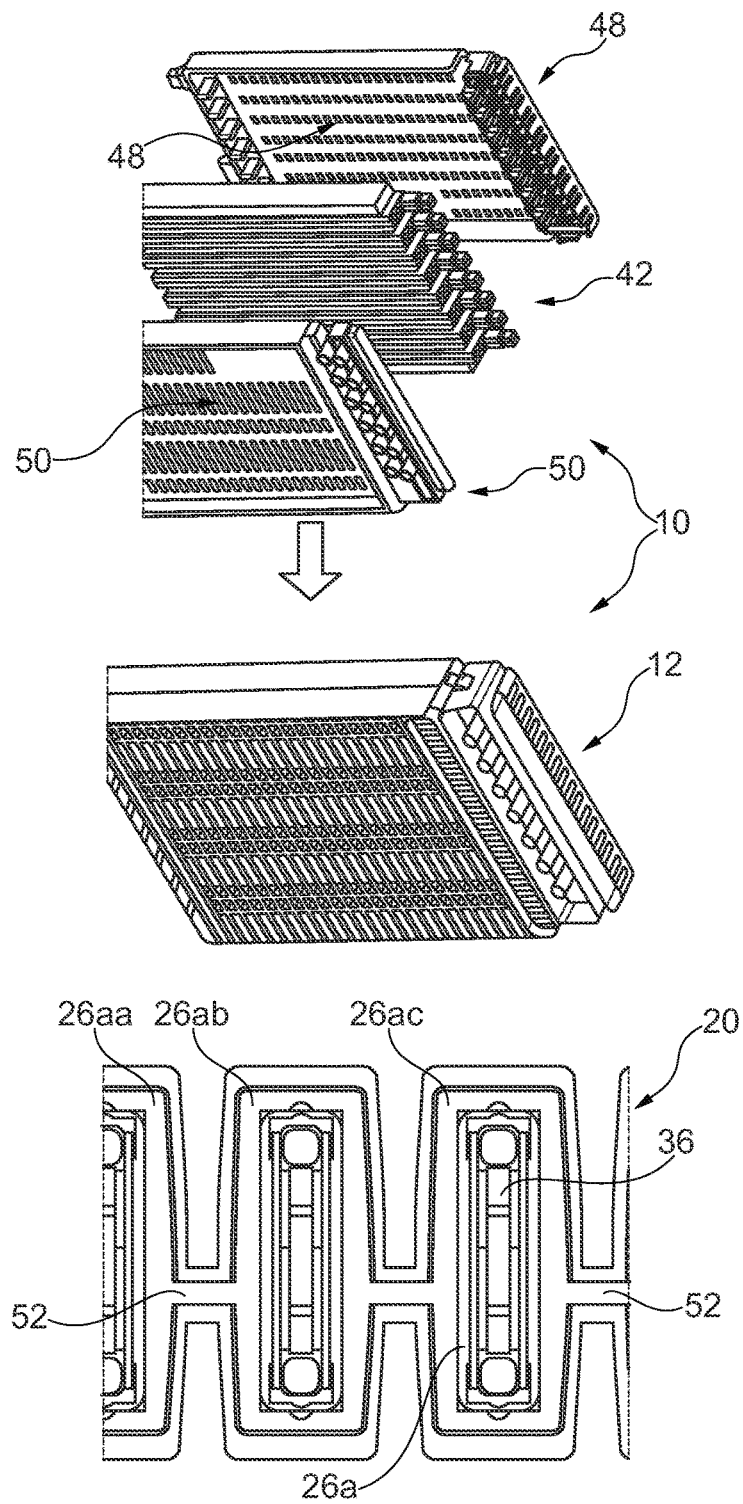
FIG. 7 shows a partial section of the heating block and two housing half-shells in an exploded view (at the top), the housing with sealing elements in an assembled state in a perspective view (in the middle), and a top plan view of the housing cover (at the bottom)

FIG. 7 shows the top part of heating block 42 and in each case two housing half-shells 48 and 50 of housing 12. The same items are labeled with the same reference characters and reference is made to the description of FIGS. 1 to 6. Electric heating device 10 is shown in the top part of FIG. 7 in an exploded view in which heating block 42 and housing half-shells 48 and 50 can be seen as individual components. In the middle part of FIG. 7, electric heating device 10 is assembled and only housing 12 as a whole can be seen. A top plan view of housing cover 20 is shown in the bottom part of FIG. 7. A heating element 36 is disposed in each opening 24 of housing cover 20, whereby heating element 36 is taken up in each case by a sealing element 26, 26a, which closes opening 24 at least partially so that no dirt and/or water can enter aluminum housing 38. The individual sealing elements 26, 26a are joined together and executed as a one-piece seal, whereby each sealing element 26 is connected with a crosspiece 52. Thus, a one-piece sealing element 54 is realized, which includes sealing elements 26, 26aa, 26ab, 26ac, 26an and crosspieces 52, 52a, 52b, 52c, 52n-1. In this case, n indicates the number of heating element 36 and the number of openings 24. As a result, the assembly of electric heating device 10 is very easy to realize, in that heating block 42, sealing element 54, and housing half-shells 48 and 50 are arranged next to one another and then assembled together.

Figure 8:
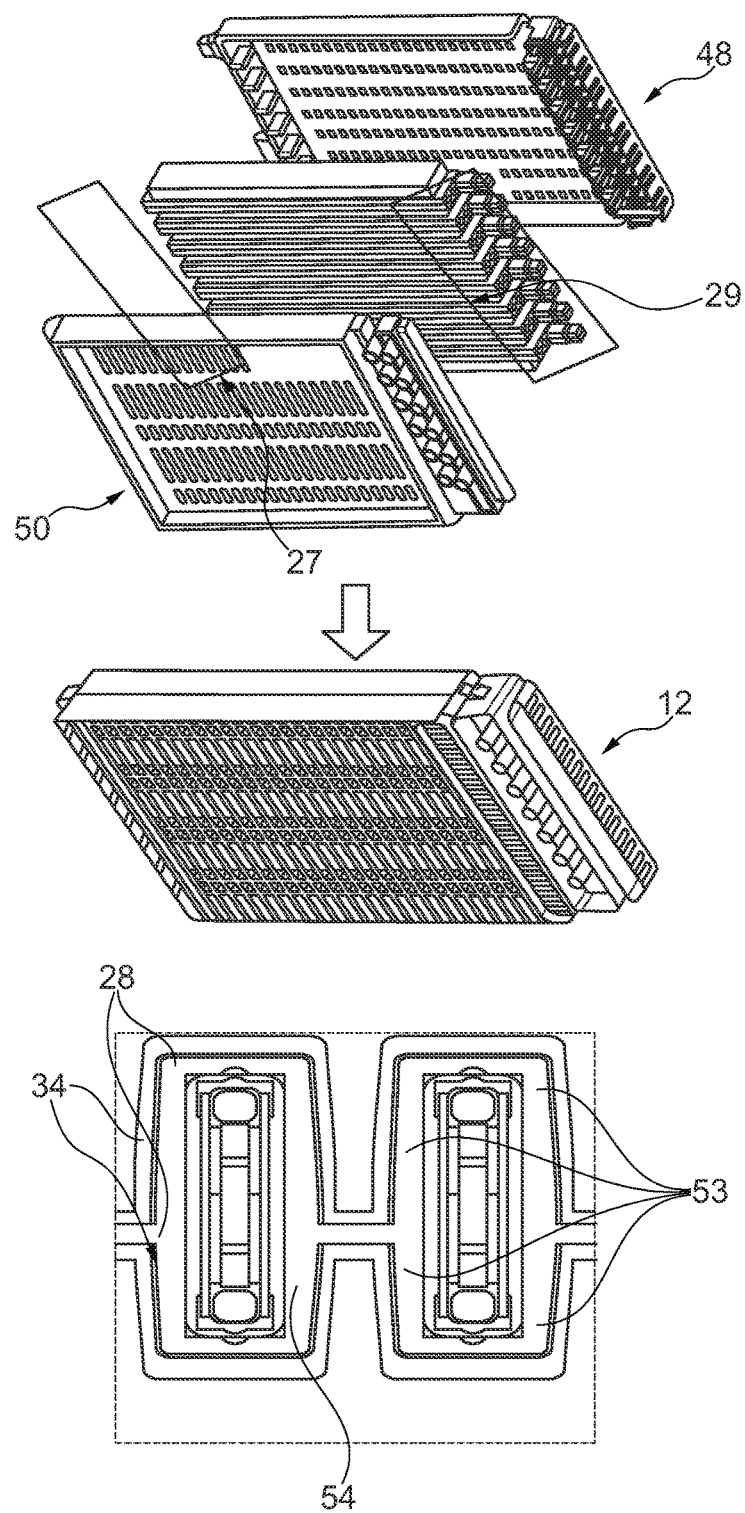
FIG. 8 shows the heating block with sealing elements and two housing half-shells in an exploded view (at the top), the housing with sealing elements in the assembled state in a perspective view (in the middle), and a top plan view of the housing cover (at the bottom)

FIG. 8 shows the complete heating block 42 and in each case two housing half-shells 48 and 50 of housing 12. The same items are labeled with the same reference characters and reference is made to the description of FIG. 7. Sealing elements 26, 26b are disposed in bottom area 27. Sealing elements 26b can be formed as individual sealing elements 26b or as a one-piece sealing element (not shown). One-piece sealing element 54 comprising sealing elements 26a is shown in the bottom part of FIG. 8 in a top plan view. Sealing element 54 with sealing elements 26a is disposed in each case in openings 24 of housing cover 20. Sealing areas 53 realized by the respective bevels 34 on housing cover 20 and bevels 28 on sealing element 26, 26a, 54 are indicated by arrows 53. Bevels 34 and 28 enable a precise positioning and assembly of heating elements 36 and sealing elements 26, 26a, 54 in housing cover 20. Housing base 22 can also have bevels (not shown), which interact with bevels (not shown) on sealing element 26b and form a sealing area on housing base 22.

Figure 9:
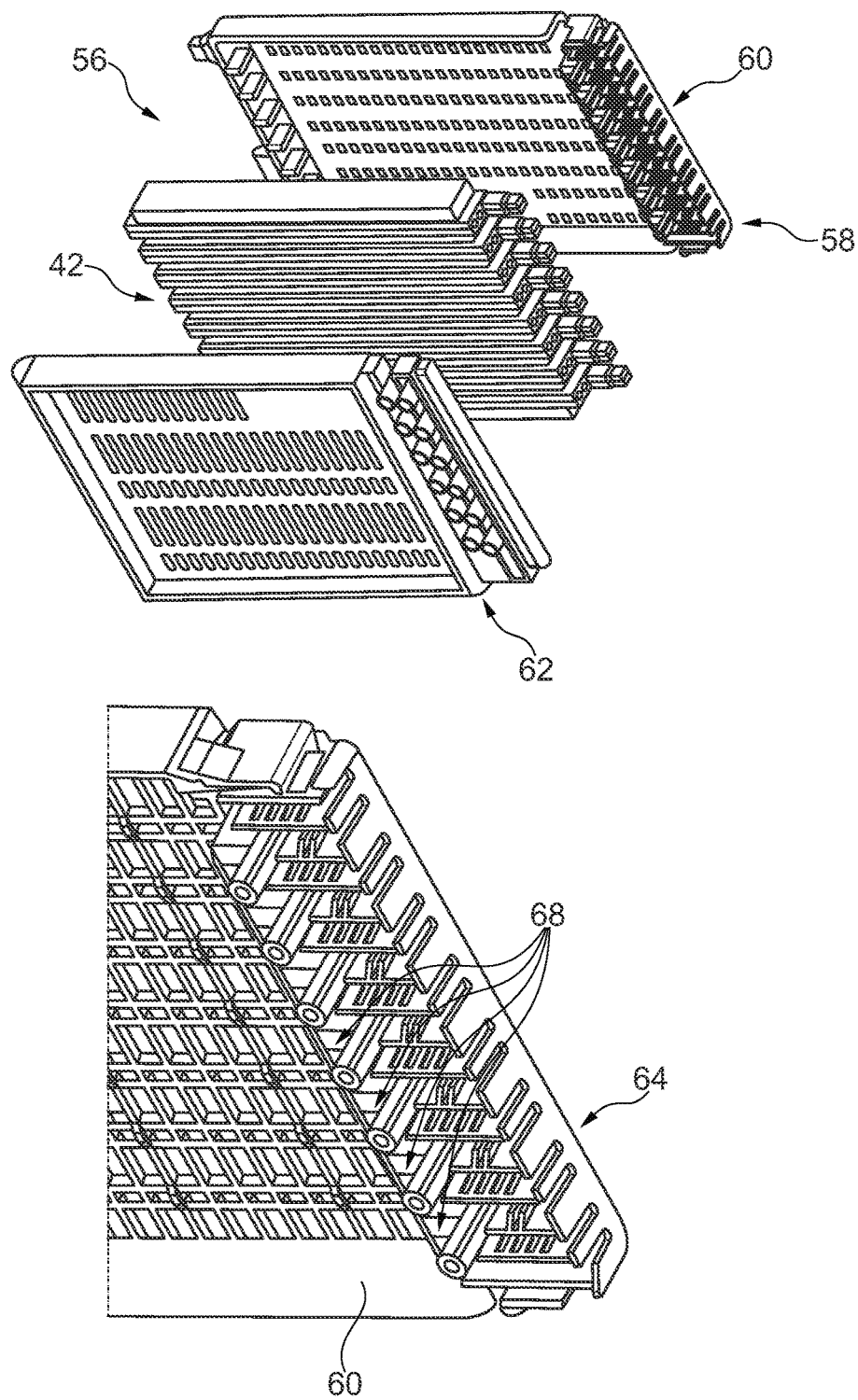
FIG. 9 shows the heating block in an exploded view and a section of the housing cover.

FIG. 9 shows an electric heating device 56, which differs from the embodiment shown in FIGS. 1 to 8 in a modified housing 58. The same items are labeled with the same reference characters and reference is made to the description of FIGS. 1 to 8. Items that are made differently but are associated with housing 58 are labeled with different reference characters. Housing 58 has two housing half-shells 60 and 62, which are likewise joined together, whereby heating block 42 is disposed between housing half-shells 60 and 62. In housing half-shells 60 and 62, in a housing cover 64 a liquid silicone rubber 66 is injected as a sealing element at the positions labeled with arrows 68. In the assembled state, said silicone rubber 66 can form a molded sealing element (not shown) of silicone rubber 66. A silicone adhesive and/or a silicone gel can be used instead of silicone rubber 66. Openings in open area 45, 45a, 45b of the particular heating element 36 can be closed in this way.

Figure 10:
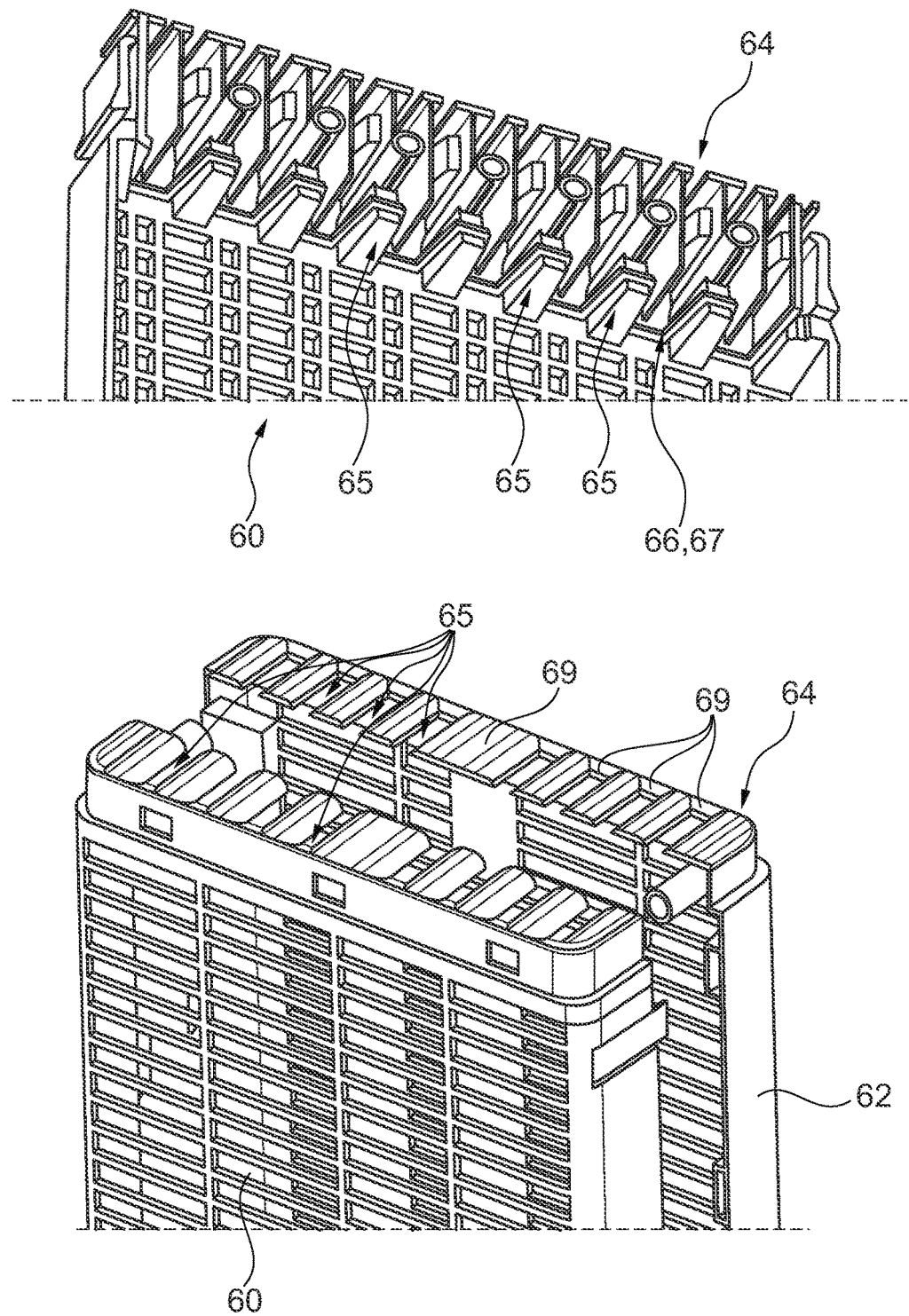
FIG. 10 shows a perspective top plan view of the housing with different sealing elements.

FIG. 10 in the top part shows housing half-shell 60 with silicone rubber 66 formed as a single piece as silicone seal 67, which forms sealing element 67. Sealing element 67 is made as a band of silicone rubber 66 and for this reason can precisely match the shape of a particular opening 65 in housing cover 64. The bottom part of FIG. 10 shows housing half-shell 60 and housing half-shell 62 with a sealing element 69, whereby sealing element 69 is formed from molded or reshaped silicone rubber 66 on housing cover 64. In this regard, housing cover 64 can be molded in with liquid silicone rubber 66, and silicon rubber 66 can harden and form sealing element 69. Preferably, housing cover 64 is made as a one-piece part with sealing element 69. Housing cover 64, however, can also be provided with sealing element 69 of silicone during production.

Figure 11:
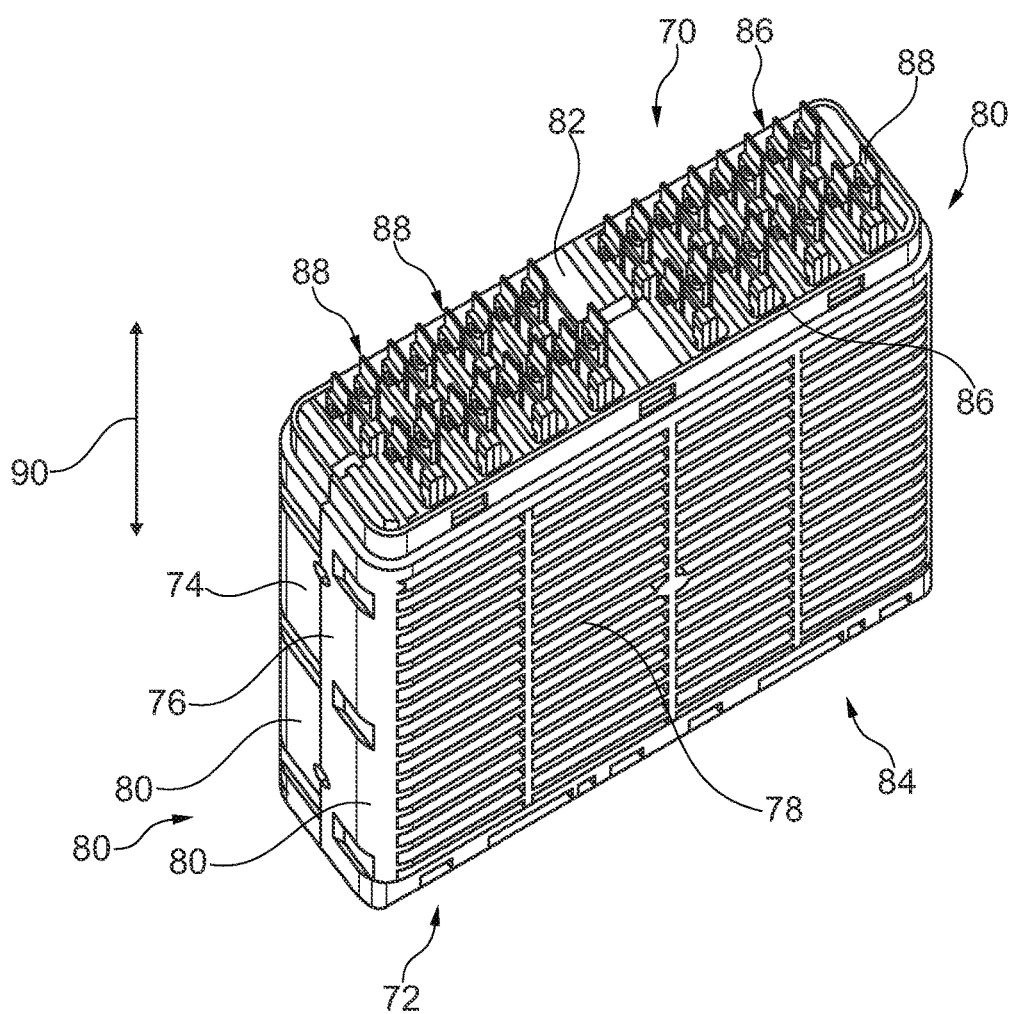
FIG. 11 shows a further exemplary embodiment of an electric heating device with heating elements.

FIG. 11 shows a further embodiment of an electric heating device 70 in a perspective view. Electric heating device 70 has a housing 72. Housing 72 has two housing half-shells 74 and 76. Each housing half-shell 74 and 76 has a housing side element 78, housing front parts 80, a housing cover 82, and a housing base 84. Openings 86 in which heating elements 88 are disposed are located on housing cover 82. Heating elements 88 preferably have PTC heating elements 88 (Positive Temperature Coefficient). Heating elements 88 are arranged in a row substantially parallel to another preferably in extension direction 90 of electric heating device 70 as indicated by arrow 90 and form a heating block that is not shown. Heating elements 88 can be arranged in one row or in two adjacent rows.

Figure 12:
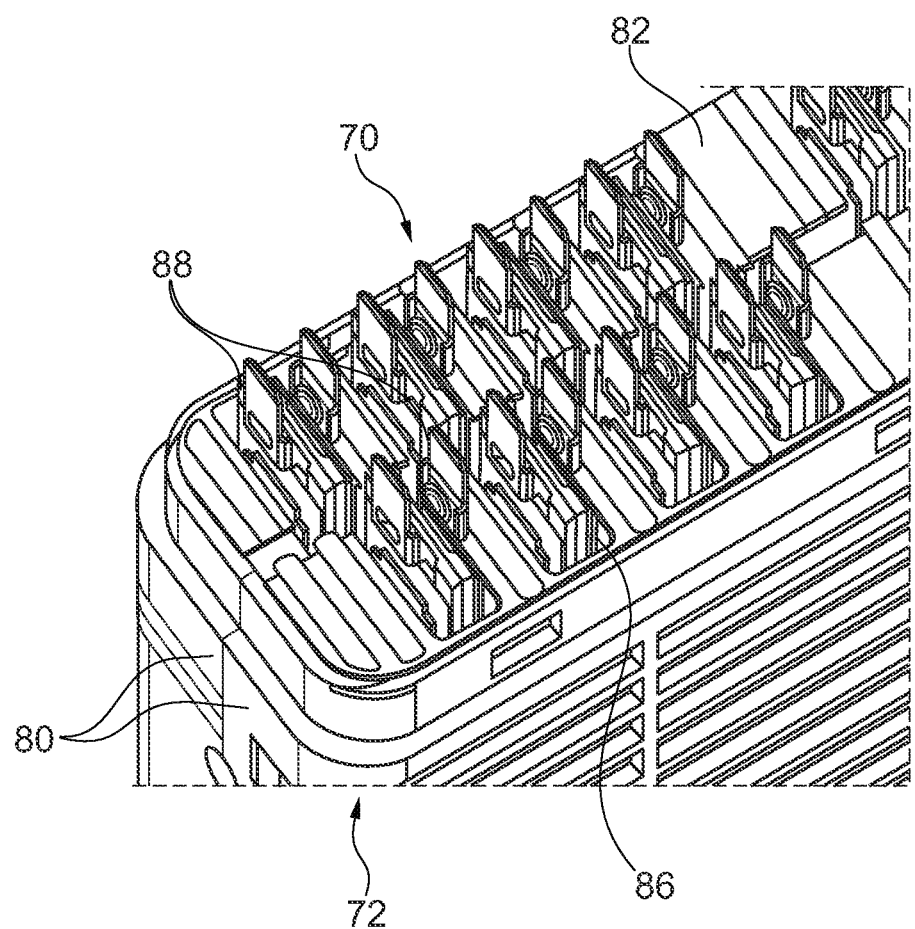
FIG. 12 shows a detailed view of the electric heating device of FIG. 11.

FIG. 12 shows an enlarged view of electric heating device 70 with unsealed openings 86. The same parts are labeled with the same reference characters as in FIG. 11.

Figure 13:
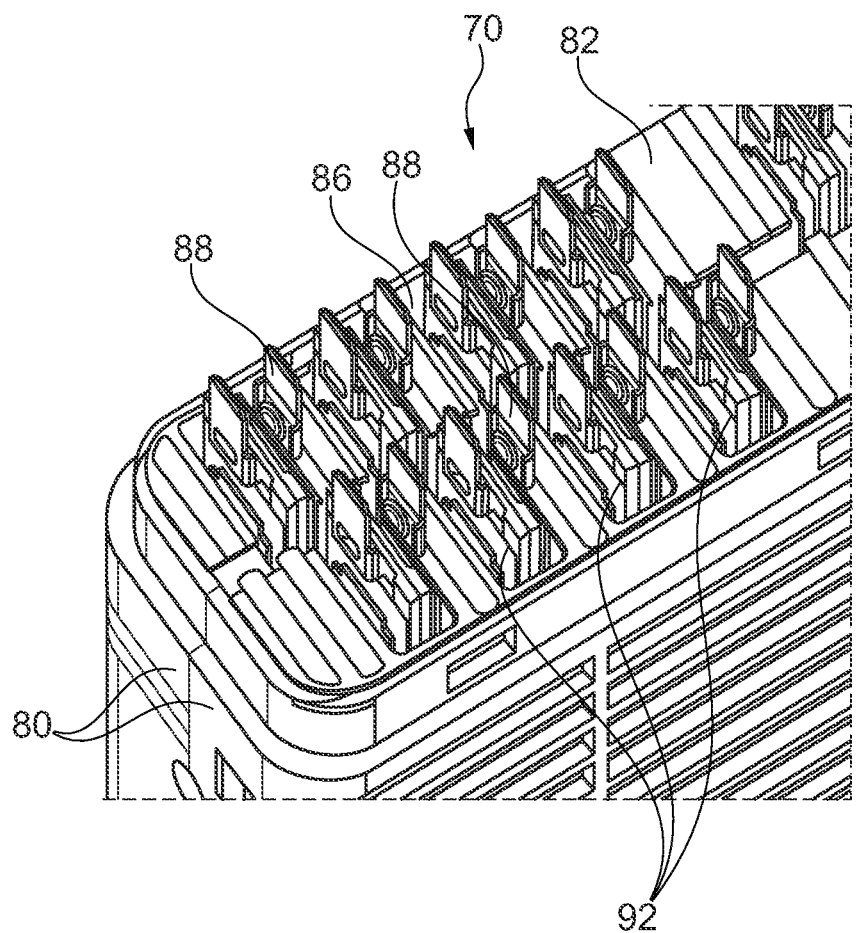
FIG. 13 shows a detailed view of the electric heating device of FIG. 12 with sealing elements.

FIG. 13 shows heating device 70, whereby heating elements 88 are each taken up in a sealing element 92. Sealing element 92 is made as a molded seal or as an adhesive/spring combination. Sealing element 92 is hereby arranged directly on housing cover 82 and/or housing base 84 (not shown). In this way, a tight connection between heating element 88 and housing cover 82 in the area of openings 86 is realized. As a result, the entry of dust and/or dirt and water can be prevented. Sealing element 92 can be made of a liquid silicone rubber. Alternatively, sealing element 92 can be a silicone adhesive and/or silicone gel. Sealing element 92 is a flexible seal and is applied directly to housing 72, particularly to housing cover 82 in the area of openings 86.

Figure 14:
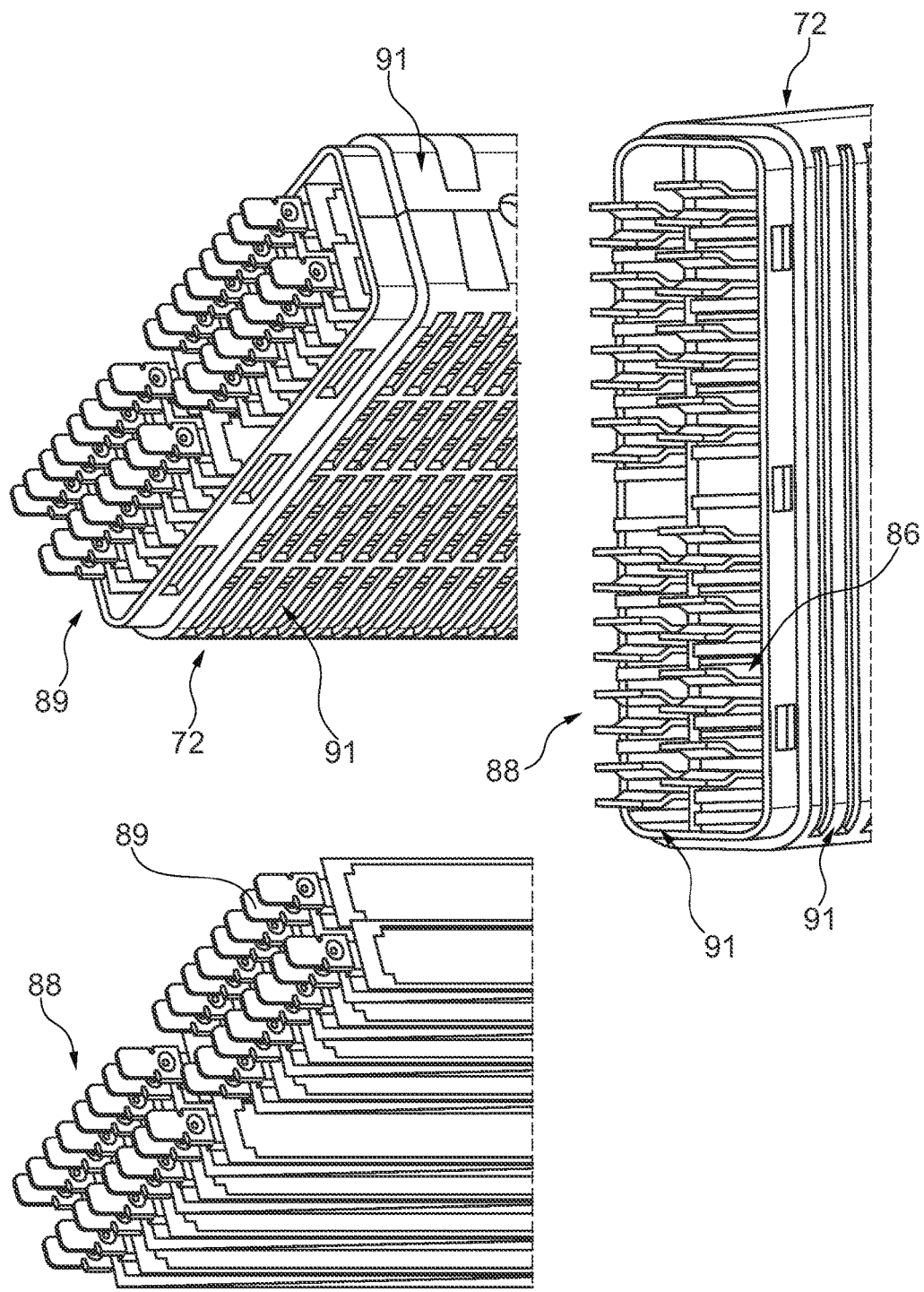
FIG. 14 shows a perspective view of the electric heating device (at the top) and the heating elements (at the bottom)

FIG. 14 in a perspective illustration shows a detailed view of electric heating device 70 (top illustration) and heating elements 88 (bottom illustration). Heating elements 88 are made as PTC heating elements 88 and arranged in two rows arranged next to one another. Heating elements 88 each have a connection 89 via which heating elements 88 can be connected to a power supply (not shown). Housing 72 is preferably made of a plastic and heating elements 88 are taken up and disposed in openings 86. No silicone is placed in the areas of housing 72 indicated by arrows 91.

Figure 15:
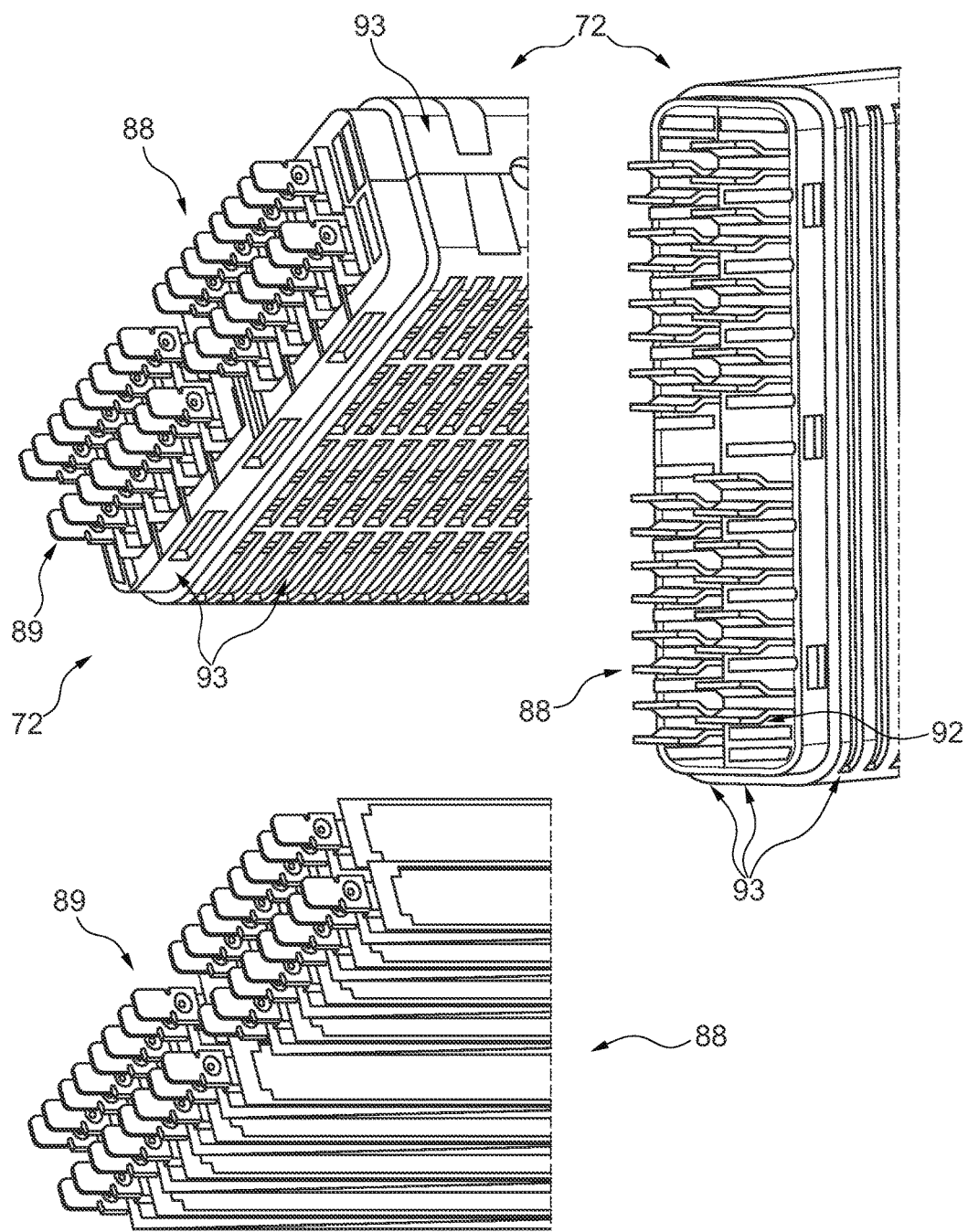
FIG. 15 shows a perspective view of the electric heating device (at the top) with a sealing element and the heating elements (at the bottom)

FIG. 15 in a perspective illustration shows electric heating device 70 of FIG. 14. The same items are labeled with the same reference characters. The housing is molded in with silicone at the areas of housing 72 indicated by arrows 93. In this regard, sealing element 92 is formed by molding in with silicone. In this case, housing 72 is molded in with silicone both in the cover area and in the base area. As a result, additional protection from dirt, particles, and/or water can be realized.

Figure 16:
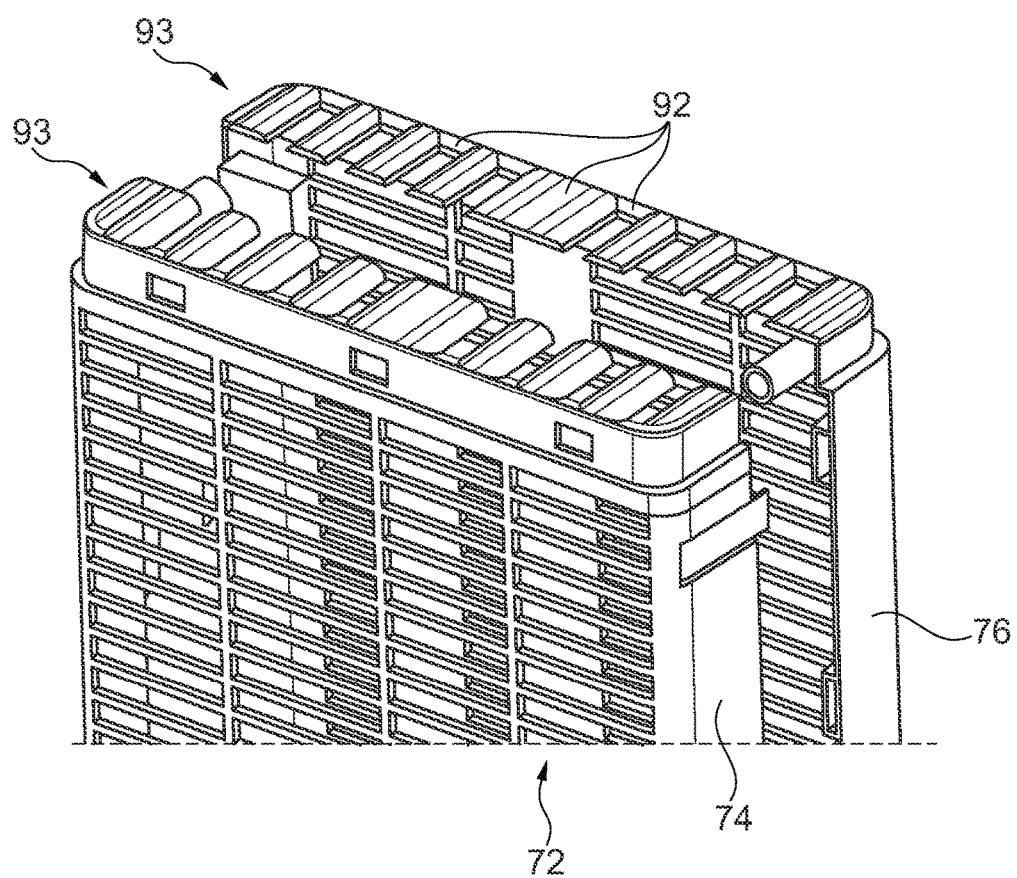
FIG. 16 shows a perspective illustration of the plastic housing with a sealing element.

In FIG. 16, the top part of the plastic frame of housing 72 is shown with housing half-shells 74 and 76, in a spaced-apart position, with sealing element 92. Housing 72 can be molded in additionally with silicone at the areas indicated by arrows 93.

The method of the invention for producing heating device 10 comprises the step of introducing bevel 28, 28a, 28b, 28c, 28d at the sealing element and/or introducing bevel 34, 34a, 34b, 34c, 34d on housing cover 20 in each case in the area of openings 24. Sealing element 26, 26a, 26b and/or sealing element 54 are placed on heating block 42 before housing 12 is assembled together.

The method for producing electric heating device 70 comprises the process step of fitting sealing element 92 in opening 86 of housing cover 82, so that opening 86 can be closed. It can be provided that in each case a sealing element 92 seals two adjacent heating elements 88 against housing cover 82, if opening 86 extends over the adjacent heating elements 88. Further, a step of molding in housing 72 with silicone is preferably provided. The molding in with silicone in this case can occur in selected areas of housing 72 to achieve protection from dirt, particles, and/or water.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric heating device comprising:
    a housing having a housing cover and a housing base each with at least one first opening;
    at least one first heating element arranged in the housing, the at least one first heating element protruding through the at least one first opening of each of the housing cover and the housing base;
    a first sealing element in which the at least one first heating element is arranged, the first sealing element being provided inside the at least one first opening of each of the housing cover and the housing base,
    wherein a bevel is provided on the housing cover and on the housing base at a perimeter of the at least one first opening of the housing cover and of the housing base,
    wherein a bevel is provided on an outer perimeter of the first sealing element, and
    wherein the bevel of the first sealing element has a same contour as the bevel at the at least one first opening, such that the bevel of the first sealing element and the bevel at the at least one first opening interact.

2. The electric heating device according to claim 1, wherein at least one second heating element is provided, wherein at least one second opening is provided in each of the housing cover and the housing base, and wherein a second sealing element for placing the second heating element in the at least one second opening of the housing cover and the housing base is provided.

3. The electric heating device according to claim 2, wherein the first sealing element is provided inside the at least one first opening of each of the housing cover and the housing base and the second sealing element is provided inside the at least one second opening of each of the housing cover and the housing base.

4. The electric heating device according to claim 1, wherein the housing has two housing half-shells, and wherein the housing half-shells are arranged substantially perpendicular to the housing cover and to the housing base.

5. The electric heating device according to claim 4, wherein the housing is a plastic housing, wherein at least the housing half-shells are plastic.

6. The electric heating device according to claim 1, wherein the housing is a plastic housing, and wherein the housing has a plastic frame.

7. The electric heating device according to claim 1, wherein the at least one first heating element is a PTC heating element or a HV PTC heating element.

8. The electric heating device according to claim 1, wherein the at least one first heating element is formed of at least two heating elements, the at least two heating elements together form a heating block.

9. A motor vehicle comprising an electric heating device according to claim 1.

10. The electric heating device according to claim 1, wherein an upper surface, a lower surface and side surfaces of the first sealing element are flat, planar surfaces.

11. A method for producing an electric heating device according to claim 1, the method comprising:
    arranging the first flexible sealing element between the at least one first heating element and the housing cover and the housing base; and
    assembling the housing and providing the bevel on the housing cover and on the housing base in an area of the at least one first opening and providing the bevel on the first sealing element.

* * * * *